United States Patent
Moeller

(10) Patent No.: US 10,899,584 B2
(45) Date of Patent: Jan. 26, 2021

(54) LIFTING DEVICE FOR WIND TURBINE COMPONENTS

(71) Applicant: SIEMENS GAMESA RENEWABLE ENERGY A/S, Brande (DK)

(72) Inventor: Jesper Moeller, Brande (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/345,755

(22) PCT Filed: Oct. 17, 2017

(86) PCT No.: PCT/EP2017/076494
§ 371 (c)(1),
(2) Date: Apr. 29, 2019

(87) PCT Pub. No.: WO2018/082913
PCT Pub. Date: May 11, 2018

(65) Prior Publication Data
US 2019/0263635 A1    Aug. 29, 2019

(30) Foreign Application Priority Data
Nov. 3, 2016   (DE) .................... 10 2016 221 582

(51) Int. Cl.
*B66C 1/10*      (2006.01)
*B66C 13/08*     (2006.01)
*F03D 13/00*     (2016.01)

(52) U.S. Cl.
CPC .............. *B66C 1/108* (2013.01); *B66C 13/08* (2013.01); *F03D 13/00* (2016.05)

(58) Field of Classification Search
CPC ......... B66C 1/108; B66C 13/06; B66C 13/08; B66C 23/185; F03D 13/00
(Continued)

(56) References Cited

U.S. PATENT DOCUMENTS 8,191,721 B2* 6/2012 Hansen .................. B66C 1/108
                                                  212/273
2011/0094987 A1   4/2011 Botwright
(Continued)

FOREIGN PATENT DOCUMENTS

WO   WO-03100249 A1 * 12/2003 ............. B66C 1/445
WO   2011137937 A2    11/2011
(Continued)

OTHER PUBLICATIONS

International Search Report and Written Opinion for PCT/EP2017/076494, filed on Oct. 17, 2017.

*Primary Examiner* — Dean J Kramer
(74) *Attorney, Agent, or Firm* — Schmeiser, Olsen & Watts LLP

(57) ABSTRACT

Provided is a lifting device for a wind turbine component including a yoke for connecting the wind turbine component to a crane, the yoke including at least one anchor point connectable to a forcing system for pushing or pulling the yoke in order to rotate the yoke around a central axis of the yoke. The yoke is configurable in at least a first closed configuration, wherein in the first closed configuration the at least one anchor point is at a first distance from the central axis of the yoke, and at least a second extended configuration, wherein in the second extended configuration the at least one anchor point is at a second distance from the central axis of the yoke greater than the first distance.

12 Claims, 3 Drawing Sheets

(58) Field of Classification Search
USPC .............. 294/81.4, 67.5; 212/167, 272, 273
See application file for complete search history.

(56) References Cited

U.S. PATENT DOCUMENTS

| | | | |
|---|---|---|---|
| 2012/0032125 A1 | 2/2012 | Diaz De Corcuera | |
| 2016/0229671 A1* | 8/2016 | Herse | B66C 23/207 |
| 2017/0233228 A1* | 8/2017 | Coners | B66C 13/48 |
| | | | 29/889.21 |

FOREIGN PATENT DOCUMENTS

| | | |
|---|---|---|
| WO | WO2011137937 A2 | 11/2011 |
| WO | 2014125460 A1 | 8/2014 |
| WO | WO2014125460 A1 | 8/2014 |

* cited by examiner

LIFTING DEVICE FOR WIND TURBINE COMPONENTS

CROSS-REFERENCE TO RELATED APPLICATIONS

This application claims priority to PCT Application No. PCT/EP2017/076494, having a filing date of Oct. 17, 2017, which is based on German Application No. 10 2016 221 582.5, having a filing date of Nov. 3, 2016, the entire contents both of which are hereby incorporated by reference.

FIELD OF TECHNOLOGY

The following relates to lifting wind turbine foundation or components. The following may relate to lifting a tower or a portion of the tower or a blade of a wind turbine during installation of the wind turbine.

BACKGROUND

In the technical field of wind turbines, components are getting larger and larger.

It is presently known to design a lifting equipment for each component which has to be lifted, for example the blades, the nacelle or the portions which constitutes the tower. Each lifting equipment typically includes a crane and a yoke attached to the crane. A gripping device is attached to the yoke has for gripping the component to be lifted. Each lifting equipment further includes anchor points, which are normally provided at the ends of the lifting equipment, and stability tack lines connected to such anchor points.

The tack wire is used for controlling the orientation of each main component. In particular the tack wire is used for controlling the rotation of the component in a horizontal plane while the component is being lifted along a vertical direction by the lifting equipment. More in particular, for landing or installing a foundation or tower or portion of a tower the orientation of the component around a vertical axis during lifting have to be controlled, in order to align it with a predefined marking. Rotation of the component up to 180 degrees is normally needed.

To obtain this, two tagline wires may be connected to the lifting equipment, for example to the gripping device of the yoke. The wires are arranged in way that pulling the wires cause, respectively, the clockwise and counter clockwise rotation of the yoke and of the component attached thereto in a plane, particularly a horizontal plane, while the component is being lifted.

Due to the increasing weight of the components, the cranes which are used to lift them during the installation phases can accept only a limited inclination with respect to the ground. As a result, the crane as a limited reach out and this also limits the angle of rotation when using a wire system. In present systems therefore rotation of the component up to 180 degrees can be assured through tagline wires only for components having limited dimensions and weight. For bigger and heavier components, the rotation has to be completed manually.

It is therefore still desirable to have an improved lifting device, in order that a rotation of up to 180 degrees around a vertical axis can be assured during lifting of a component of a wind turbine, such as a blade or a nacelle or a tower or a portion of a tower.

SUMMARY

An aspect relates to a lifting device solving the above described inconveniences experimented in known lifting device.

It may be in particular an aspect of embodiments of the present invention to provide a lifting device assuring a rotation of up to 180 degrees around a vertical axis during lifting of a component of a wind turbine, independently from dimensions and weight of the component.

According to embodiments of the present invention, a lifting device for a wind turbine component comprises:
a yoke for connecting the wind turbine component to a crane,
the yoke including at least one anchor point connectable to a forcing system for pushing or pulling the yoke in order to rotate the yoke around a central axis of the yoke,
the yoke being configurable in at least a first closed configuration, wherein in the first closed configuration the at least one anchor point is at a first distance from the central axis of the yoke, and at least a second extended configuration, wherein in the second extended configuration the at least one anchor point is at a second distance from the central axis of the yoke, the second distance being greater than the first distance.

Advantageously, according to embodiments of the present invention, the yoke of the lifting system can be configured in different configurations. The configurations differ from each other for the respective distance between the at least one anchor point and the central axis of the yoke. This provides the possibility to adapt a dimension of the yoke, and in particular a width of the yoke, to the component to be lifted and installed and to the angle according to which the component has to be rotated prior to installation.

According to embodiments of the present invention, the yoke is configurable in at least a third intermediate configuration wherein in the third intermediate configuration the at least one anchor point is at a third distance from the central axis of the yoke, the third distance being greater than the first distance and smaller than the second distance.

Advantageously, a yoke with a first closed configuration and at least two further configurations, respectively extended and intermediate, improve the versatility of the lifting system. For example, according to a possible operative implementation of embodiments of the present invention, the yoke may be reconfigured from the extended to the intermediate configuration, during the rotation of the component, in order to avoid interference with the crane or other elements of the lifting device.

According to other embodiments of the present invention, the yoke comprises a main body and at least one movable arm, the at least one movable arm being movable with respect to the main body between at least the first closed configuration and the second extended configuration, the at least one anchor point being provided on the at least one movable arm.

In particular, two movable arms, each comprising a respective anchor point, may be used to deploy the yoke in the extended and in the intermediate configurations.

Advantageously, the use of a yoke with arms provides an effective way to achieve a configurable yoke according to embodiments of the present invention.

According to other possible embodiments of the present invention, the two movable arms are aligned in the second extended configuration. In particular, the two movable arms in the second extended configuration may be aligned on plane orthogonal to the central axis of the yoke.

More in particular, the anchor point(s) are provided at a free end of the at least one movable arm(s). This provides a maximum extension, in particular a maximum width in a horizontal plane, of the yoke.

According to respective possible embodiments of the present invention, the at least one movable arm may translate or with respect to the main body of the yoke to move from the first closed configuration to the second extended configuration and/or to the third intermediate configuration.

According to a possible operative implementation of the present invention, the movable arms may rotate, with respect to main body of the yoke, in a plane including the central axis of the yoke, folding in and out between the closed and the extended configuration. In addition, the movable arms may rotate, with respect to main body of the yoke, in a plane orthogonal to the central axis of the yoke for reaching the intermediate configuration.

According to other possible embodiments of the present invention, wherein lifting device includes a forcing system having a tagline attachable to the at least one anchor point of the yoke for pulling the yoke at the at least one anchor point for rotating the yoke around a central axis of the yoke. In particular, such a tagline may include two wires, respectively attachable to the anchor points of the yoke for pulling the yoke at the two anchor points for rotating the yoke around a central axis of the yoke.

Advantageously, this provides a versatile and easily applicable forcing device, which effectively completes the lifting device.

BRIEF DESCRIPTION

Some of the embodiments will be described in detail, with references to the following Figures, wherein like designations denote like members, wherein.

DETAILED DESCRIPTION

Figure 1:
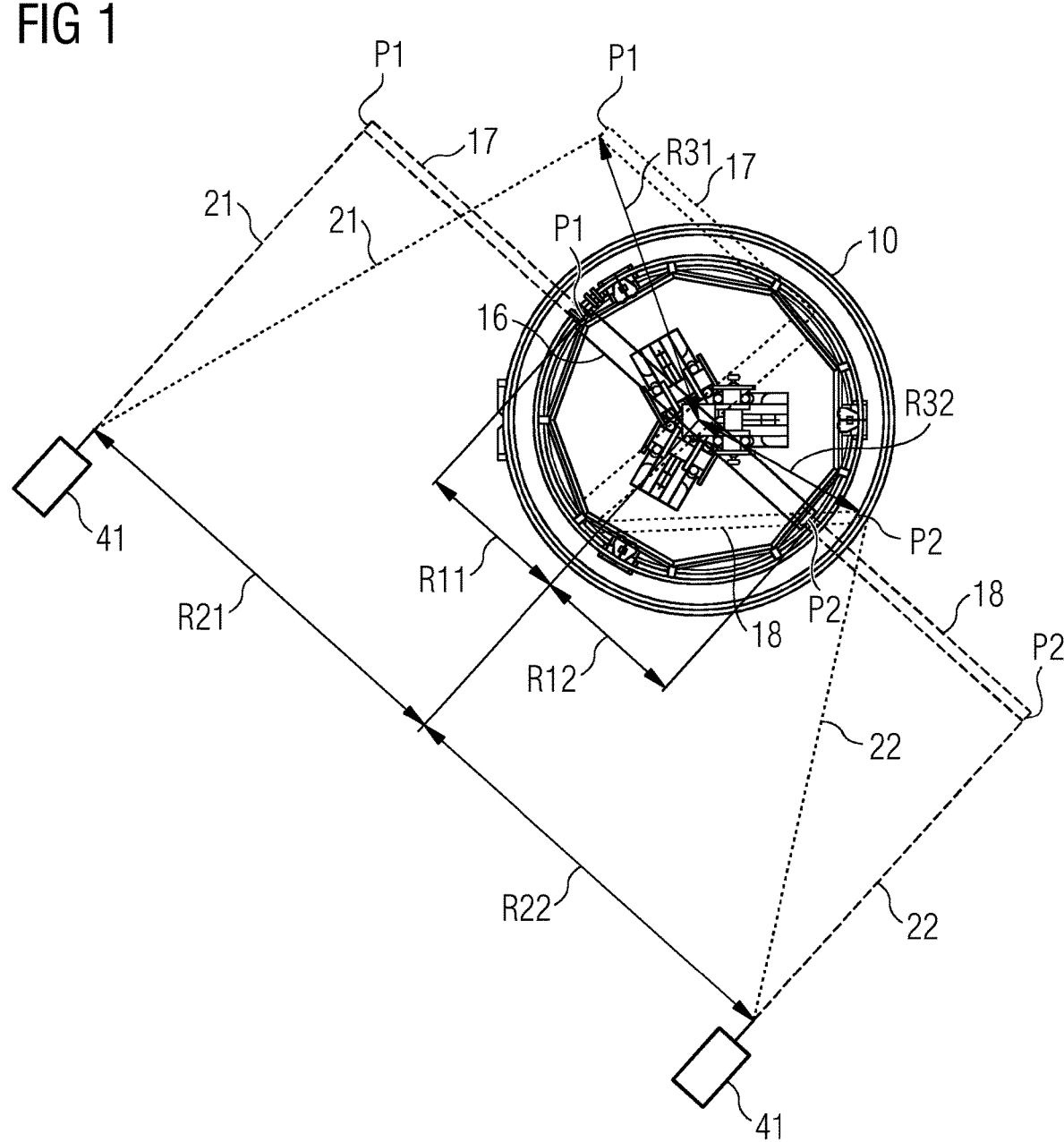
FIG. 1 shows a top view of a lifting device according to embodiments of the present invention.

The illustrations in the drawings are schematic. It is noted that in different figures, similar or identical elements are provided with the same reference signs.

Figure 2:
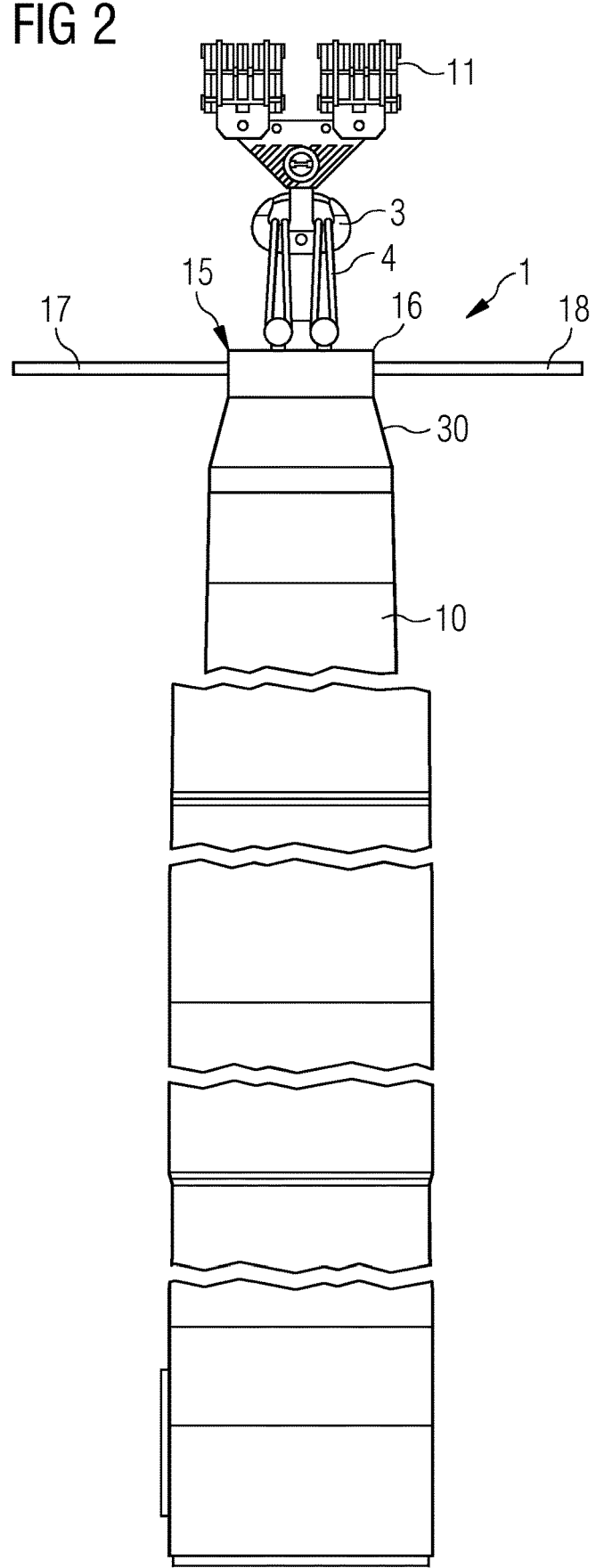
FIG. 2 shows a lateral view of the lifting device shown in FIG. 1.

FIGS. 1 and 2 show a crane 11 (not completely represented) having a hook 3 to which a lifting device 1 according to embodiments of the present invention is attached be means of a plurality of attachment cables 4. The crane 11 is a conventional one and therefore not described in further detail. Also, the hook 3 is a conventional and already know-in-the-art hook, with which conventional crane are normally provided and which, in particular, can freely rotate of 360 degrees around a rotational axis. In operation, i.e. during the use of the crane 11 and of the lifting device 1 for mounting a wind turbine component 10 to a wind turbine, the rotational axis of the hook 3 is normally oriented parallel to a vertical direction.

Figure 3:
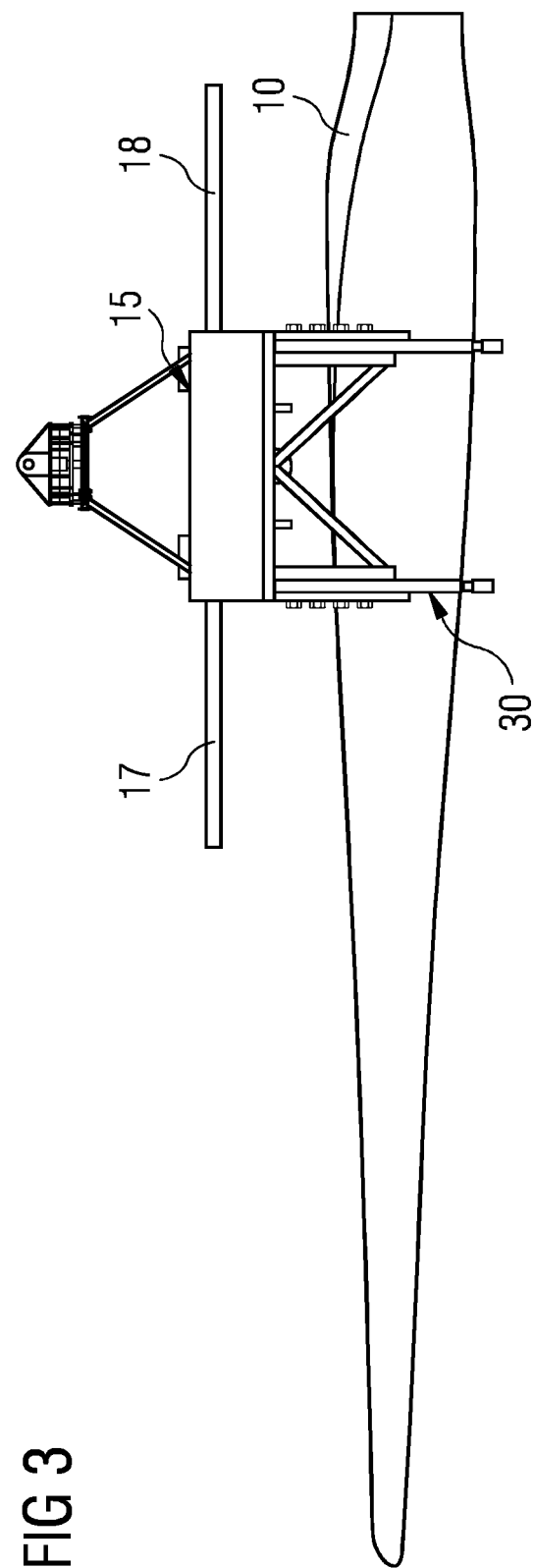
FIG. 3 shows a lateral view of another embodiment of a lifting device according to embodiments of the present invention.

The lifting device 1 comprises a yoke 15 for connecting the wind turbine component 10 to the crane 11. In FIGS. 1 and 2 the turbine component 10 is a portion of a tower of a wind turbine. In FIG. 3 the turbine component 10 is a blade of a wind turbine. According to other embodiments of the present invention (not represented), the turbine component 10 may be any component of a wind turbine, for example a nacelle or a power generator. For connecting the wind turbine component 10 to the crane 11, the yoke 15 comprises a gripping or rigging system 30 for fixing the wind turbine component 10 to the yoke 15 in order that during the installation operations they can be jointly moved.

The yoke 15 includes two anchor points P1, P2, which are connectable to a forcing system for pulling the yoke 15 in order to rotate the yoke 15 around a central axis Y. During the installation operations, the central axis Y of the yoke 15 is aligned to the rotational axis of the hook 3, in order that the yoke 15, the hook 3 and attachment cables 4 can be rotated together around the rotational axis of the hook 3.

To perform such rotation, the lifting device 1 includes a forcing system having a tagline attachable to the two anchor points P1, P2. The tagline includes two wires 21, 22, respectively attachable to the anchor points P1, P2 of the yoke 15.

The two wires 21, 22 may, for example, attached to the anchor points P1, P2 by means of hooks provided at respective ends of the wires 21, 22.

Upon pulling of the two wires 21, 22, the yoke 15 is respectively pulled at the two anchor points P1, P2 and, as a result of the applied pulling forces, respectively clockwise or anti clockwise rotated around its central axis Y. The pulling forces are applied to the two wires 21, 22 by means of respective actuators 41, 42, for example two winches, of the forcing system, placed in two respective fixed positions. In operation, each of the two wires 21, 22 extends between the respective anchor point P1, P2 and a respective actuator 41 42, which applies the pulling force to the respective wire 21, 22.

According to other embodiments of the present invention (not represented) the forcing system may of other type, for example it may include, instead of or in addition to wires, a plurality of rigid elements, such as poles, for pushing, instead of pulling, the yoke 15 at the anchor points P1, P2 for causing the clockwise or anti clockwise rotation of the yoke 15. According to another example, the yoke 15 may be pushed or pulled at only one anchor point.

In all the embodiments, the yoke is configurable in at least a first closed configuration, wherein the at least one anchor point P1, P2 is at a first distance R11, R12 from the central axis Y, and at least a second extended configuration, wherein in the at least one anchor point P1, P2 is at a second distance R21, R22 from the central axis Y. The second distance R21, R22 is greater than the first distance R11, R21.

In the embodiments where more than one anchor points P1, P2 are used, the first distances R11, R12 of the respective anchor points P1, P2 from the central axis Y may be equal to each other or different. This apply also to the second distances R21, R22, i.e. the second distances R21, R22 of the respective anchor points P1, P2 from the central axis Y may be equal to each other or different.

In addition, as shown in the embodiment of FIGS. 1 and 2, the yoke 15 is configurable in a third intermediate configuration, wherein the at least one anchor point P1, P2 is at a third distance R31, R32 from the central axis Y. The third distance R31, R32 is greater than the first distance R11, R12 and smaller than the second distance R21, R22.

In the embodiments where more than one anchor points P1, P2 are used, the third distances R31, R32 of the respective anchor points P1, P2 from the central axis Y may be equal to each other or different.

The yoke 15 may be also configured according to a plurality of intermediate configurations, each intermediate configuration being characterized by an intermediate distance of the at least one anchor point P1, P2 from the central axis Y, the intermediate distance being comprised between the first distance of the closed configuration and the second distance of the extended configuration.

As shown in the embodiment of FIGS. 1 and 2, the different configuration of the yoke 15 may be reached through two arms 17, 18, movable with respect to a main body 16 of the yoke 15. Each of the two movable arms 17, 18 has the same length L. Each of the two movable arms 17, 18 can be moved independently from the other. Each of the two movable arms 17, 18 respectively comprises one of the anchor points P1, P2 at a respective free end of the movable arms 17, 18.

In the first closed configuration the movable arms 17, 18 (in continuous lines in FIG. 1) are in a central position of the main body 16 of the yoke 15, parallel to each other. The first distances R11, R12 of the respective anchor points P1, P2 from the central axis Y is equal to half of the length L of the movable arms 17, 18.

In the second extended configuration, the two arms 17, 18 (in dashed lines in FIG. 1) are extended in opposite direction with respect to the first closed configuration and both aligned therewith, in such a way that the second distance R21, R22 equal the first distances R11, R12 plus the length L of the movable arms 17, 18. In both the first closed configuration and the second extended configuration, the movable arms 17, 18 are aligned on a plane orthogonal to the central axis Y of the yoke 15, when the yoke 15 is in operation.

To reach the second extended configuration from the first closed configuration, the movable arms 17, 18 may, according to respective embodiments of the present invention, translate or rotate with respect to the main body 16 of the yoke 15. In particular, the movable arms 17, 18 may rotate between the first closed configuration and the second extended configuration in a plane including the central axis Y of the yoke 15, i.e. a plane aligned in operation with a vertical plane.

With reference to the embodiment of FIGS. 1 and 2, the movable arms 17, 18, once reached the second extended configuration rotate around axis parallel to the central axis Y of the yoke 15 to reach the third intermediate configuration (in dotted lines in FIG. 1). In particular, in operation the movable arms 17, 18 rotate on a horizontal plane to reach the third intermediate configuration.

These provisions assure that each arm 17, 18 can reach a plurality of intermediate configurations, each being defined by an angle between the arm in the intermediate configuration and the arm in the first or second configuration. The plurality of intermediate configurations of each arm 17, 18 are independent from the position of the other arm 18, 17.

According to other possible embodiments of the present invention (not represented), the movable arms 17, 18 translate to reach the third intermediate configuration.

According to other possible embodiments of the present invention (not represented), the yoke comprises only one movable arm.

The possibility to provide different configurations of the yoke 15 and, in particular, different distances R11, R12, R21, R22, R31, R32 between anchor points P1, P2 and the central axis of the yoke 15, gives the possibility to adapt a dimension, in particular a width, extending from one to the other of the anchor points P1, P2, of the yoke 15 to the component 10 be lifted and to the shape and dimensions of the surrounding devices, for example the crane 11, during the installation operations. This prevents both the yoke and the wires 21, 22 of the tagline to interfere with the surrounding devices, while the component 10 is being rotated during installation around a vertical axis. The configuration can be changed during the installation operations in order to adapt a dimension, in particular a width, of the yoke 15 and the positions of the wires 21, 22 to the surrounding devices for each angle of rotation of the yoke around its central axis. Angle of rotation of 180 degrees of the yoke 15 around its central axis Y may be reached.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A lifting device for a wind turbine component comprising:
    a yoke for connecting the wind turbine component to a crane,
    the yoke including at least one anchor point connectable to a forcing system for pushing or pulling the yoke in order to rotate the yoke around a central axis of the yoke,
    the yoke being configurable in at least a first closed configuration, wherein in the first closed configuration the at least one anchor point is at a first distance from the central axis of the yoke, and at least a second extended configuration, wherein in the second extended configuration the at least one anchor point is at a second distance from the central axis of the yoke, the second distance being greater than the first distance;
    the yoke comprising a main body and at least one movable arm, the at least one movable arm being movable with respect to the main body between at least the first closed configuration and the second extended configuration, the at least one anchor point being provided on the at least one movable arm;
    wherein the at least one movable arm is rotatable in a plane including the central axis of the yoke and movable in a plane orthogonal to the central axis of the yoke to deploy the yoke in the first closed configuration and the second extended configuration during operation of the lifting device.

2. The lifting device according to claim 1, wherein the yoke is configurable in at least a third intermediate configuration wherein in the third intermediate configuration the at least one anchor point is at a third distance from the central axis of the yoke, the third distance being greater than the first distance and smaller than the second distance.

3. The lifting device according to claim 1, wherein the yoke comprises at least two movable arms, each of the two movable arms comprising a respective anchor point.

4. The lifting device according to claim 3, wherein the two movable arms are aligned in the second extended configuration.

5. The lifting device according to claim 4, wherein the two movable arms in the second extended configuration are aligned on the plane orthogonal to the central axis of the yoke.

6. The lifting device according to claim 3, wherein the forcing system include two wires respectively attachable to the anchor points of the yoke for pulling the yoke at the two anchor points for rotating the yoke around the central axis of the yoke, each of the two wires extending in operation between the respective anchor point and an actuator for pulling the two wires.

7. The lifting device according to claim 1, wherein the at least one anchor point is provided at a free end of the at least one movable arm.

8. The lifting device according to claim 1, wherein the at least one movable arm translate with respect to the main body of the yoke to move from the first closed configuration to the second extended configuration and/or to a third intermediate configuration.

9. The lifting device according to claim 1, wherein the at least one movable arm rotate with respect to the main body of the yoke to move from the first closed configuration to the second extended configuration and/or to a third intermediate configuration.

10. The lifting device according to claim 9, wherein the at least one movable arm rotate in the plane orthogonal to the central axis of the yoke.

11. The lifting device according to claim 1, wherein the lifting device includes a forcing system having a tagline attachable to the at least one anchor point of the yoke for pulling the yoke at the at least one anchor point for rotating the yoke around the central axis of the yoke.

12. The lifting device according to claim 1, wherein the yoke include a gripping system for gripping at least a portion of a tower of wind turbine.

* * * * *